United States Patent
Ishikawa

(10) Patent No.: US 8,409,052 B2
(45) Date of Patent: Apr. 2, 2013

(54) STARTING METHOD FOR HYBRID ELECTRIC VEHICLE AND SYSTEM ARCHITECTURE OF HYBRID ELECTRIC VEHICLE

(75) Inventor: Yasuki Ishikawa, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 228 days.

(21) Appl. No.: 13/098,390

(22) Filed: Apr. 29, 2011

(65) Prior Publication Data

US 2012/0277058 A1 Nov. 1, 2012

(51) Int. Cl.
*B60W 10/08* (2006.01)
*B60W 10/24* (2006.01)

(52) U.S. Cl. .............................. 477/3; 903/907

(58) Field of Classification Search ....... 477/3; 903/907
See application file for complete search history.

(56) References Cited

U.S. PATENT DOCUMENTS

| 6,799,650 | B2 * | 10/2004 | Komiyama et al. ...... 180/65.245 |
| 7,229,381 | B2 * | 6/2007 | Niessen et al. ................... 477/3 |
| 2009/0143929 | A1 * | 6/2009 | Eberhard et al. ............... 701/22 |

* cited by examiner

*Primary Examiner* — Edwin A Young

(57) ABSTRACT

Provided is a starting method for hybrid electric vehicle, which includes the steps of: (a1) as the temperature of a battery module of the hybrid electric vehicle is below a first threshold temperature, allowing the vehicle control unit of the hybrid electric vehicle to turn on a first switch; (a2) converting the DC power transmitted from the battery module to an integrated starter generator of the vehicle through the first switch into a first AC power by the integrated starter generator which is operating under the starter mode, and starting the internal combustion engine of the vehicle with the first AC power; and (a3) executing a heating process to warm up the battery module by a battery heater, in which the charging line between the integrated starter generator and the battery module is cut off and the integrated starter generator is operating under a rectifier sub-mode, thereby allowing the integrated starter generator to supply electric power to the battery heater in order to heat the battery module.

16 Claims, 6 Drawing Sheets

STARTING METHOD FOR HYBRID ELECTRIC VEHICLE AND SYSTEM ARCHITECTURE OF HYBRID ELECTRIC VEHICLE

FIELD OF THE INVENTION

The invention relates to a hybrid electric vehicle and the starting method thereof, and more particularly to a hybrid electric vehicle that can be electrically started under a low temperature.

BACKGROUND OF THE INVENTION

In recent years, scientists have developed electric vehicle with an electric propulsion system to substitute the traditional internal combustion vehicle with an internal combustion engine propulsion system, so as to resolve the problems of the price inflation of petroleum, the vast amount of exhaust emission, and green house effect. Nonetheless, electric vehicle requires a bulky on-board battery to be mounted on the vehicle. This would result in the inconvenience in charging, long charging time, and poor endurance of the vehicle. Thus, a hybrid electric vehicle that combines the advantages of high energy-saving effect of the electric vehicle and the advantages of high endurance and the convenience in fuel replenishment for the fuel vehicle, has been developed to meet the ongoing demands of ecological protection or environmental protection.

The hybrid electric vehicle is equipped with an internal combustion engine and an electric motor and is conditionally propelled by the internal combustion engine or the electric motor. The battery mounted in the hybrid electric vehicle can be charged by commercially available electric power or charged by the electricity rendered by an integrated starter generator which is driven by the operation of the internal combustion engine. When the capacity of the battery is full, the electric motor is powered by the battery. When the capacity of the battery is low, the electric motor is powered by the integrated starter generator which is ignited by the operation of the internal combustion engine, while the battery is charged by the integrated starter generator as well. As the hybrid electric vehicle uses electricity to propel the vehicle, the hybrid electric vehicle is advantageous in terms of low fuel consumption, low pollution, low energy consumption, low noise, high endurance, and high efficiency.

However, the cells in the battery, for example, the lithium iron phosphate battery (LiFePO4), is subjected to the change of temperature. If the battery is under a low temperature, for example, a temperature below zero-degree Celsius, the chargeable power of the lithium iron phosphate battery cell will be descended to 5% of its full power. This would make the hybrid electric vehicle difficult to operate under the generation mode by the integrated starter generator (ISG) of the vehicle and propel the vehicle at the same time. Also, with the change of the traction motor of the vehicle, the integrated starter generator might affect the battery. Also, in order to protect the battery, the operation of the vehicle might be unstable if the battery is detached from the inverter. Therefore, it is needed to provide an energy source to warm up the battery before the vehicle is started.

SUMMARY OF THE INVENTION

An object of the invention is to provide a hybrid electric vehicle for heating the battery module of the hybrid electric vehicle when the battery module is under a low temperature so as to effectively increase the temperature of the battery module, thereby resuming the state of the battery module to a chargeable state and allowing the battery module to normally output sufficient power to propel the hybrid electric vehicle. Therefore, the inventive hybrid electric vehicle can be used under a low temperature circumstances. Thus, the invention can solve the problem by using the internal combustion engine to generate electric energy for the traction motor after heating the battery.

To this end, the invention proposes a starting method for hybrid electric vehicle, which includes the steps of: (a1) as the temperature of the battery module of the hybrid electric vehicle is under a first threshold temperature, allowing the vehicle control unit of the hybrid electric vehicle to turn on a first switch; (a2) converting the DC power transmitted from the battery module through the first switch to a first three-phase AC power, by the integrated starter generator which is operated under the starter mode, and starting the internal combustion engine with battery power; and (a3) executing a heating process to warm up the battery module by the battery heater.

To this end, the invention provides a hybrid electric vehicle, which includes: an internal combustion engine for combusting fuel and transforming chemical energy into mechanical power; an integrated starter generator connected to the internal combustion engine for providing the power required to start the internal combustion engine or generating electric power by the power provided by the internal combustion engine; a traction motor inverter connected to the battery to propel the hybrid electric vehicle by DC power; a transmission for outputting traction motion torque to propel the hybrid electric vehicle; a battery module for storing electric energy; a battery heater for selectively heating the battery module; a switch unit connected to the integrated starter generator inverter, the battery module, and the battery heater; and a vehicle control unit for manipulating the hybrid electric vehicle. When the battery module is under a relatively low state-of-charge and the battery temperature is rather low, the vehicle control unit executes a starting process to allow the battery heater to receive the DC power through the switch unit and heat the battery module through the switching operation of the switch unit.

Now the foregoing and other features and advantages of the present invention will be best understood through the following descriptions with reference to the accompanying drawings, wherein:

DESCRIPTION OF THE PREFERRED EMBODIMENT

An exemplary embodiment embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 1:
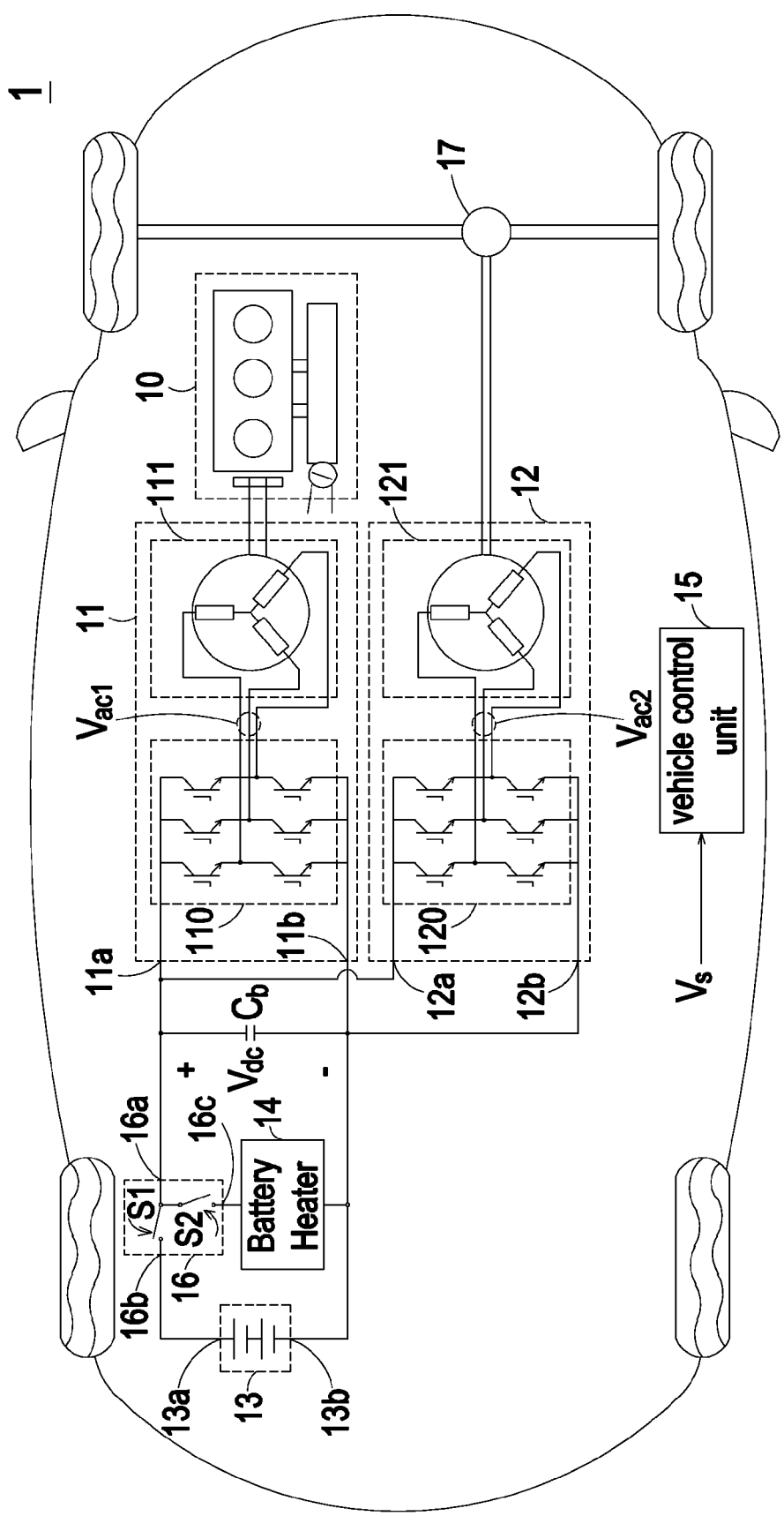
FIG. 1 shows the system architecture of the hybrid electric vehicle according to an exemplary embodiment of the invention.

Referring to FIG. 1, the system architecture of the hybrid electric vehicle according to an exemplary embodiment of the invention is illustrated. As shown in FIG. 1, the hybrid electric vehicle 1 includes a internal combustion engine 10, an integrated starter generator (ISG) 11, a traction motor 12, a battery module 13, a battery heater 14, a vehicle control unit 15, a switch unit 16, and a transmission 17. The internal combustion engine 10 and the traction motor 12 respectively use fuel and electricity to generate propelling power. For example, by combusting the petroleum, the chemical energy is transformed into mechanical energy. The integrated starter generator (ISG) 11 is used to start the operation of the internal combustion engine 10 or transform the mechanical power rendered by the internal combustion engine 10 into electric energy. The integrated starter generator (ISG) 11 is mechanically connected to the internal combustion engine 10. The ISG windings are connected to an ISG inverter 110 to generate a three-phase AC voltage. The integrated starter generator (ISG) 11 has a first connecting terminal 11a electrically connected to the switch unit 16 and a second connecting terminal 11b electrically connected to the second end 13b (i.e. the negative end) of the battery module 13. The traction motor 12 is used to provide the propelling torque for propelling the vehicle. The traction motor 12 is mechanically connected to the transmission 17. The traction motor windings are connected to a traction motor inverter 120 to generate a three-phase AC voltage. The traction motor inverter 120 has a third connecting terminal 12a electrically connected to the switch unit 16 and a fourth connecting terminal 12b electrically connected to the second end 13b of the battery module 13. That is, the traction motor inverter 120 is connected in parallel with the integrated starter generator (ISG) inverter 110.

In this embodiment, the battery module 13 includes a multiplicity of batteries and a battery monitor unit (not shown), and is selectively connected to the battery heater 14 through the switch unit 16. The vehicle control unit 15 is able to acquire the operation data of the battery module 13 from the battery monitor unit of the battery module 13. The operation data of the battery module 13 may be, for example, the temperature, capacity, output current, charging current, or output voltage of the battery module 13. One end of the battery heater 14 is electrically connected to the switch unit 16 and the other end of the battery heater 14 is electrically connected to the second end 13b of the battery module 13. The battery heater 14 is used to selectively heat the battery module 13 through the switching operation of the switch unit 16. The vehicle control unit 15 is electrically connected to the internal combustion engine 10, the integrated starter generator (ISG) 11, the traction motor 12, the battery module 13, and the control terminal or communication port of the switch unit 16 (not shown). The vehicle control unit 15 is used to control the operation of the hybrid electric vehicle according to the manipulating signal Vs input by the manipulation of the vehicle. The manipulating signal may generated by the driver's operation to the gas pedal. The first terminal 16a, the second terminal 16b, and third terminal 16c of the switch unit 16 are respectively connected to the first connecting terminal 11a of the integrated starter generator (ISG) inverter 110, the first end of the battery module 13, and one end of the battery heater 14. The switching operation of the switch unit 16 is controlled by the vehicle control unit 15 so as to selectively connect the first end 13a of the battery module 13 and one end of the battery heater 14 to the first connecting terminal 11a of the integrated starter generator (ISG) inverter 110 through the switch unit 16. The transmission 17 is mechanically connected to the traction motor 12 for outputting propelling torque to propel the hybrid electric vehicle.

The integrated starter generator (ISG) inverter 110 is operating under a starter mode or a generator mode. Also, the generator mode may be further subdivided into a rectifier sub-mode and a converter sub-mode. The moving part of the integrated starter generator 11, such as the rotation shaft (not shown), is connected to the mechanical structure of the internal combustion engine 10. The three-phase windings of the integrated starter generator 11 is connected to the three-phase output of the ISG inverter 110 for starting the internal combustion engine 10 or transforming the mechanical power provided by the internal combustion engine 10 into electric power. The both terminals of the DC power side of the ISG inverter 110 are respectively connected to the switch unit 16 and the second end 13b of the battery module 13 through the first connecting terminal 11a and the second connecting terminal 11b.

The moving part of the traction motor 121, such as the rotation shaft (not shown), is connected to the mechanical structure of the transmission 17. The three-phase winding of the traction motor 121 is connected to the three-phase output of the traction motor inverter 120 for providing the propelling power for propelling the vehicle. The both terminals of the DC power side of the traction motor inverter 120 are respectively connected to the switch unit 16 and the second end 13b of the battery module 13 through the third connecting terminal 12a and the fourth connecting terminal 12b. The switch unit 16 includes a first switch S1 and a second switch S2, in which the second switch S2 is connected in series with the battery heater 14 and the first switch S1 is connected in series with the battery module 13. The switching operation of the first switch S1 and the switching operation of the second switch S2 are controlled by the vehicle control unit 15. Hence, the first end 13a of the battery module 13 and one end of the battery heater 14 can be selectively connected to the first connecting terminal 11a of the integrated starter generator (ISG) inverter 110 through the first switch S1 and the second switch S2, respectively.

In this embodiment, the hybrid electric vehicle 1 further includes a first capacitor Cb which is connected to the DC power side of the ISG inverter 110 and the traction motor inverter 120 for filtration. When the driver manipulates the vehicle to move, the vehicle control unit 15 controls the internal combustion engine 10, the integrated starter generator (ISG) inverter 110, the traction motor inverter 120, and the switch unit 16, thereby allowing the electric power of the DC power to be supplied from the ISG inverter 110 (the ISG inverter 110 is operating under the generator mode) or the battery module 13. When the capacity of electric energy of the battery module 13 is large enough, the electric power of the DC power is supplied from the battery module 13, the vehicle control unit 15 turns on the first switch S1 to allow the battery module 13 to output the DC power to the DC power side of the traction motor inverter 120 through the first switch S1 and convert the DC power into a three-phase AC power by the traction motor inverter 120. The three-phase AC power is applied to drive the traction motor 121 to propel the transmission 17 in order to output propulsion torque. Under this condition, the vehicle uses the electric power of the battery module 13 to generate propelling power to propel the vehicle. Consequently, the advantages of zero fuel consumption, low pollution, low energy consumption, low noise, and high efficiency can be attained.

Because the battery module 13 continuously outputs the DC power, the capacity of the battery module 13 will descend gradually. When the vehicle control unit 15 detects that the capacity of the battery module 13 is as low as a predetermined ratio (5% to 15%) of its rated capacity, the vehicle control unit 15 executes a startup process to start the operation of the integrated starter generator (ISG) inverter 110 and the internal combustion engine 10. By propelling the vehicle through the consumption of the fuel by the internal combustion engine 10 and selectively charging the battery module 13, the driving millage of the vehicle is prolonged.

Figure 2:
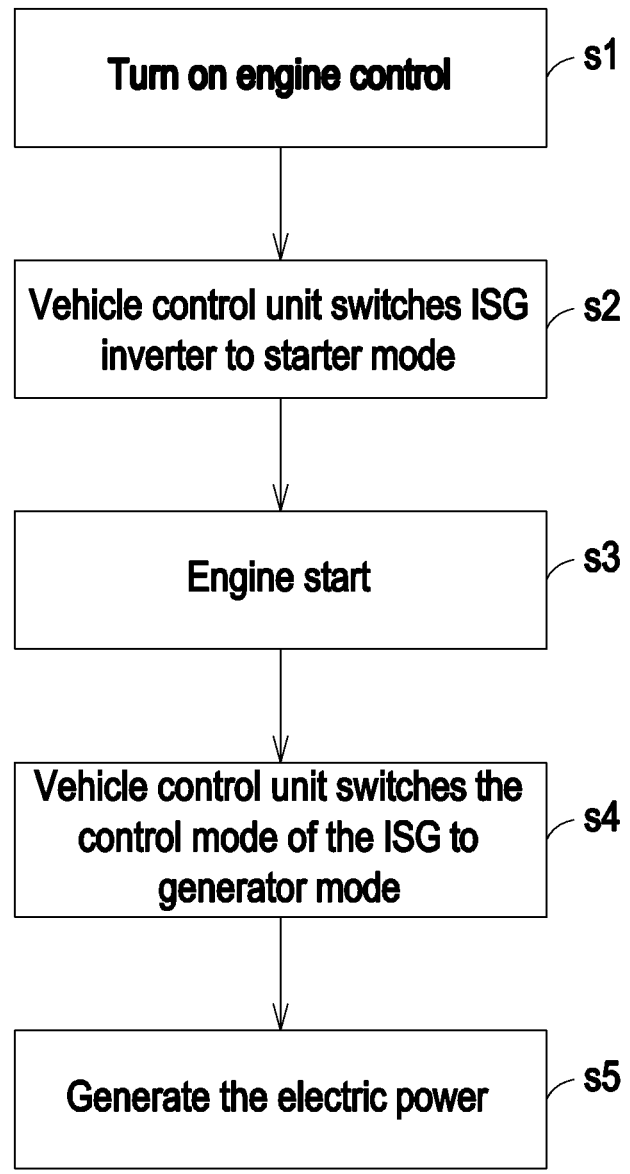
FIG. 2 is a flow chart illustrating the starting process of generation of electric power by the internal combustion engine according to an exemplary embodiment of the invention.

In this embodiment, the normal starting process of generation of electric power by the internal combustion engine is illustrated in FIG. 2. As shown in FIGS. 1 and 2, the process starts with step S1. At step S1, the vehicle control unit 15 is turned on and at the step S2 the vehicle control unit 15 controls the ISG inverter 110 to operate under the starter mode. Next, at the step S3 the ISG inverter 110 starts the engine. After the engine is started, the internal combustion engine 10 starts operating. The process continues with step S4. At step S4, the vehicle control unit 15 switches the operation mode of the integrated starter generator (ISG) inverter 110 to the generator mode. Under this condition, the integrated starter generator (ISG) 11 generates three-phase AC power, and the first three-phase AC power is converted into the DC power by the ISG inverter 110. Under this condition, the DC power is generated by the ISG inverter 110, as shown in step S5. Hence, the electric power comes from the capacitor Cb and the battery module 13 and goes back to the capacitor Cb and the battery module 13. The DC power can be provided for the traction motor inverter 120 to propel the vehicle. Also, the DC power can be selectively provided to charge the battery module 13.

Nevertheless, when the battery module 13 is under a low temperature, for example, a temperature below zero-degree Celsius, the battery module 13 can not be charged. The battery module 13 under a low temperature is able to supply the minimum electric power required to start the internal combustion engine 10 but decreased the capability of propelling the vehicle. As the battery module 13 under a low temperature, it is not able to be charged regardless of the capacity of the battery module 13. In this embodiment, the battery module 13 is made by a lithium iron phosphate battery (LiFePO4). The lithium iron phosphate battery (LiFePO4) will suffer from the aforementioned drawbacks under a low temperature. In order to address the drawbacks of the battery module 13 under a low temperature, the vehicle control unit 15 can control the heating of the battery module 13 when the driver is starting the vehicle, namely, when the vehicle is started, or driving the vehicle. The control mechanism for the vehicle control unit 15 to control the heating of the battery module 13 is as follows. When the vehicle control unit 15 detects that the temperature of the battery module 13 is lower than a threshold temperature such as 10-degree Celsius, the vehicle control unit 15 carries out a heating process to drive the battery heater 14 to heat the battery module 13. In this case, it is needed to start the engine to obtain the electric power for heating, thereby rapidly increasing the temperature of the battery module 13. Afterwards, when the vehicle control unit 15 detects that the temperature of the battery module 13 reaches an appropriate temperature range, for example, when the temperature of the battery module 13 is higher than the threshold temperature, the vehicle control unit 15 turns off the second switch S2 to stop the battery heater 14 from heating the battery module 13. Under this condition, the battery module 13 can output power and also can be charged in full range to provide sufficient to propel the vehicle. Moreover, the charging electric power is generated by the ISG 11 and is not used by the traction motor 12. Also, the battery module 13 can be resumed to the chargeable state.

Figure 3:
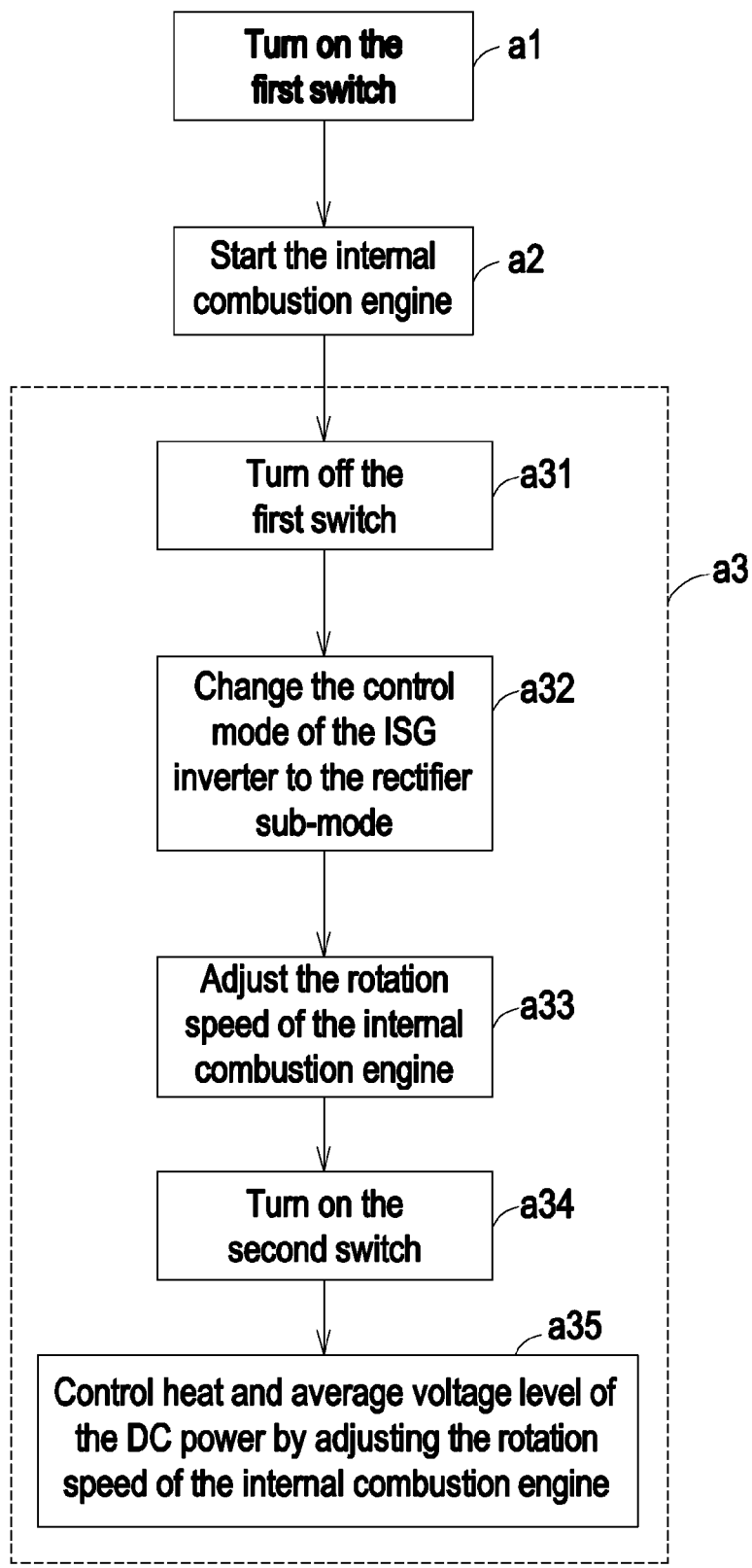
FIG. 3 is a flow chart illustrating the starting process including the heating process for the hybrid electric vehicle according to an exemplary embodiment of the invention.
Figure 4:
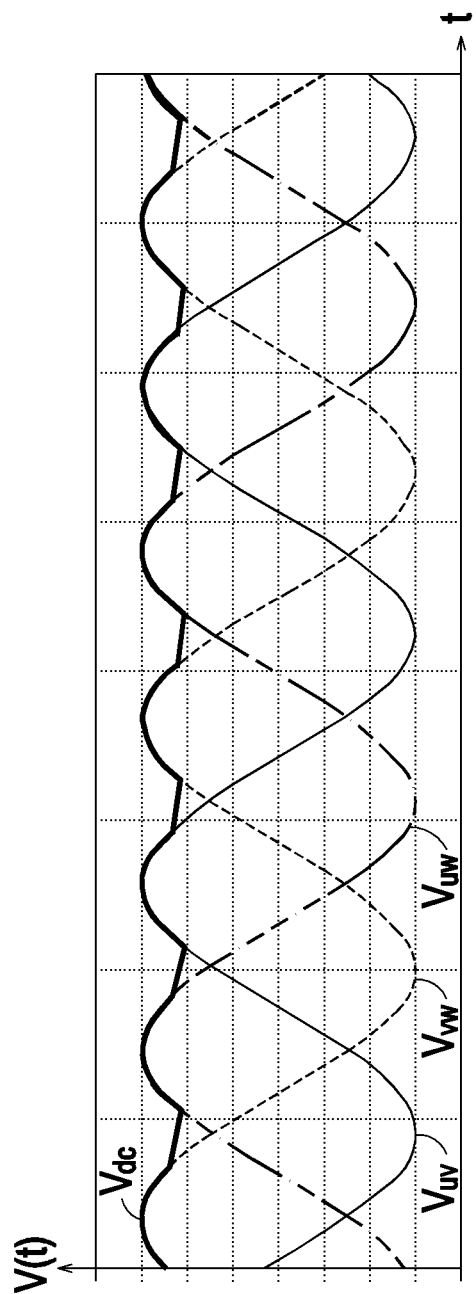
FIG. 4 shows the waveforms of the three-phase AC power generated by the ISG and the DC power under the rectifier sub-mode.

Referring to FIGS. 1, 2, 3 and 4, in which FIG. 3 is a flow chart illustrating the starting process including the heating process according to an exemplary embodiment of the invention; and FIG. 4 shows the waveforms of the first three-phase AC current and the DC current generated by the ISG inverter 110 under the rectifier sub-mode when the battery module 13 is not connected. In this embodiment, when the driver is starting the vehicle and the temperature of the battery module 13 is lower than the first threshold temperature, the vehicle control unit 15 carries out a starting process including a heating process. The starting process includes the following steps. At step a1, the vehicle control unit 15 turns on the first switch S1 and turns off the second switch S2. That is, the circuit between the first terminal 16a and the second terminal 16b is close and the circuit between the first terminal 16a and the second terminal 16c is open. At step a2, the vehicle control unit 15 switches the operating mode of the integrated starter generator (ISG) inverter 110 to the starter mode to start the operation of the integrated starter generator (ISG) 11 and the internal combustion engine 10. Thus, the engine start running and the ISG 11 start generating electric power. Afterwards, at step a3, a heating process is performed.

The heating process a3 includes the following sub-steps. At step a31, the vehicle control unit 15 turns off the first switch S1 and the second switch S2. That is, the circuit between the first terminal 16a and the second terminal 16b is open and the circuit between the first terminal 16a and the third terminal 16c is open.

Next, at step a32, the vehicle control unit 15 switches the operating mode of the integrated starter generator (ISG) inverter 110 to the rectifier sub-mode to direct the DC power outputted from the integrated starter generator (ISG) 11. Because the first switch S1 is turned off, the DC power output from the integrated starter generator (ISG) 11 does not charge the battery module 13 through the first switch S1. Then, at step a33, the vehicle control unit 15 adjusts the rotation speed of the internal combustion engine 10, for example speeding up the rotation speed of the internal combustion engine 10, so as to prevent the internal combustion engine 10 from being shut off due to the relatively high electric energy output from the integrated starter generator (ISG) 11.

At step a34, the vehicle control unit 15 turns off the first switch S1 and turns on the second switch. That is, the circuit between the first terminal 16a and the second terminal 16b is open and the circuit between the first terminal 16a and the third terminal 16c is close. The DC power outputted from the integrated starter generator (ISG) inverter 110 can be introduced to the battery heater 14 through the second switch S2 so as to heat the battery module 13, thereby increasing the temperature of the battery module 13. In the meantime, the switching elements of the ISG inverter 110 which are made up of IGBTs are turned off, and the ISG inverter 110 employs the diodes to rectify the ISG three-phase AC voltage Vac1 into a constant DC voltage of 300V for example without the switching of IGBTs. The ISG three-phase AC voltage Vac1 includes a first-phase AC voltage Vac1-*u*, a second-phase AC voltage Vac1-*v* and a three-phase AC voltage Vac1-*w*. Thus, the DC voltage Vdc varies with the waveform of the ISG three-phase AC voltage Vac1, as shown in FIG. 4. Also, as the first switch S1 is turned off, the DC voltage Vdc outputted from the integrated starter generator (ISG) inverter 110 can not charge the battery module 13. Under this condition, the battery module 13 is prohibited from being charged. At step a35, in order to control the heat provided by the battery heater 14 to the battery module 13 and the average voltage level of the DC voltage Vdc, the vehicle control unit 15 can adjust the rotation speed of the internal combustion engine 10 according to the temperature of the battery module 13.

Figure 5:
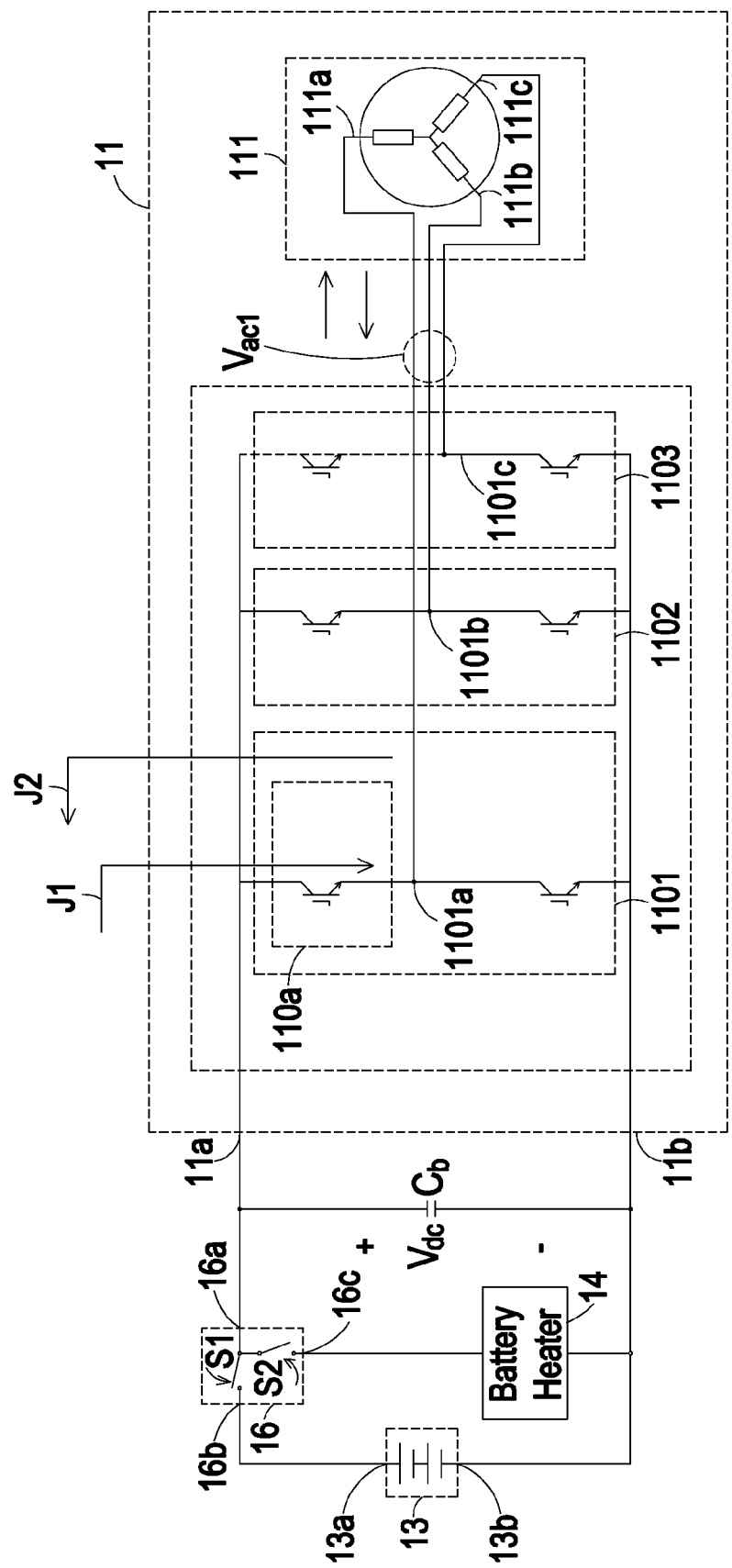
FIG. 5 shows the current flow path when the integrated starter generator is operated.

Referring to FIGS. 1 and 5, in which FIG. 5 shows the current flow path when the integrated starter generator is operated. The ISG inverter 110 includes a plurality of inverting units 110*a*. The inverting unit 110*a* includes a switching element and a diode. Preferably, the switching element is an insulated gate bipolar transistor (IGBT) and the diode is a flywheel diode. In this embodiment, the ISG inverter 110 includes six inverting units 110*a*. The six inverting units 110*a* can form a first inverting arm 1101, a second inverting arm 1102 and a third inverting arm 1103. Each of the inverting arm 1101~1103 includes a first connection node 1101*a*, a second connection node 1102*a* and a third connection node 1103*a*, respectively. The three-phase winding of the integrated starter generator 111 includes a first power terminal 111*a*, a second power terminal 111*b* and a third power terminal 111*c*. The first connection node 1101*a* is coupled to the first power terminal 111*a*, the second connection node 1102*a* is coupled to the second power terminal 111*b*, and the third connection node 1103*a* is coupled to the third power terminal 111*c*.

Referring to FIG. 5 again. When the integrated starter generator (ISG) inverter 110 is operating under the generator mode, the switching elements of the ISG inverter 110 11 are turned on and off so as to rectify the ISG three-phase AC voltage Vac1 into a constant DC voltage of 300V. For example, when the switching element Q1 is turned on, the current I from the integrated starter generator 111 will pass through the switching element Q1, as indicated by the first current flow path J1 shown in FIG. 5. When the switching element Q1 is turned off, the electromotive force (EMF) generated by the integrated starter generator 111 will return through the diode, as the second current flow path J2 shown in FIG. 5. In this embodiment, the heating process a3 can include the sub-steps of a33 and a35 so that the stability of the ISG inverter 110 can be enhanced when the integrated starter generator (ISG) 11 is operating under the rectifier sub-mode and when the first switch S1, the second switch S2 and the battery heater 14 are turned on. This is because when the ISG 11 is operating under the generator mode, the capacitor Cb is the only source of the electric energy when the IGBT is turned on.

Figure 6:
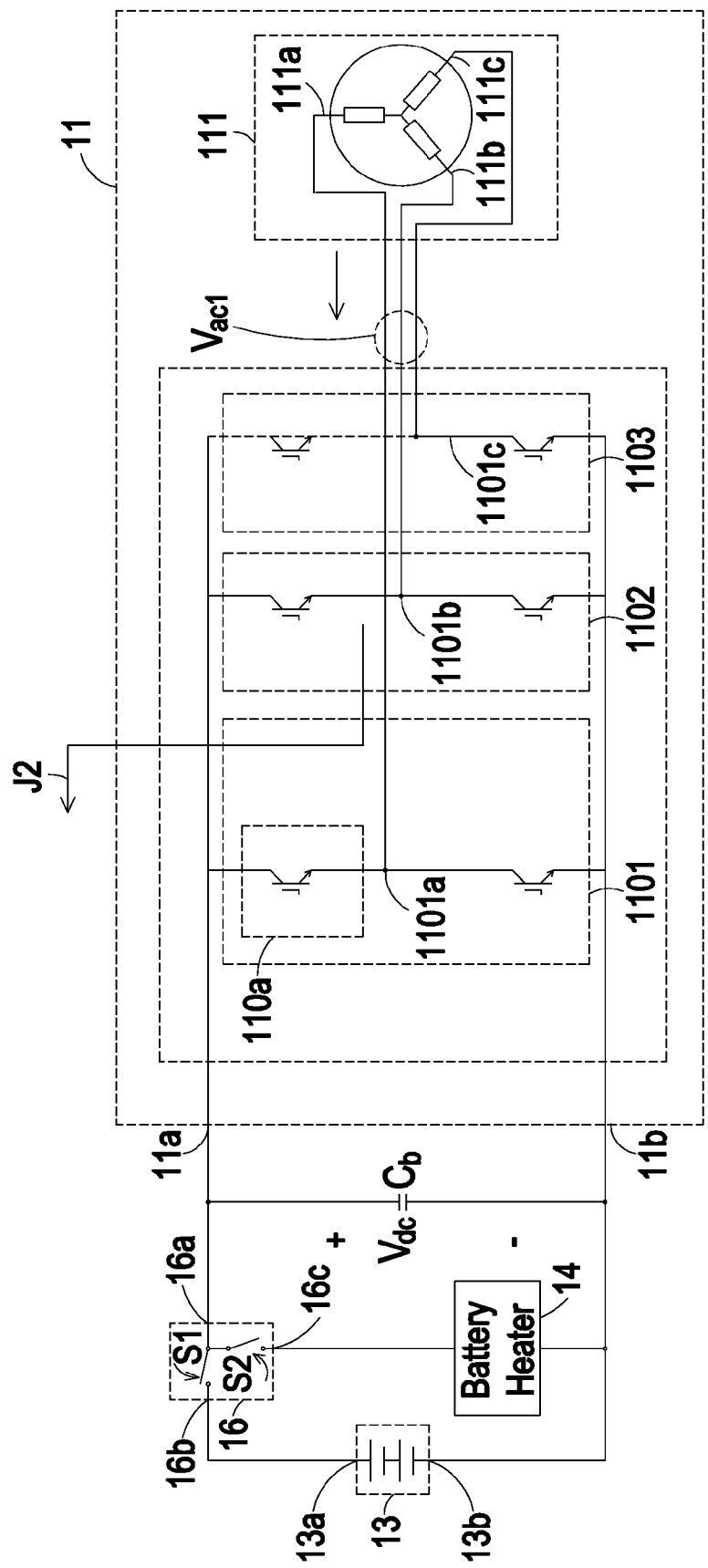
FIG. 6 shows another current flow path when the integrated starter generator is operated.

Referring to FIGS. 1, 4 and 6, in which FIG. 6 shows another current flow path. When the integrated starter generator (ISG) inverter 110 is operating under the rectifier sub-mode, the switching elements of the ISG inverter 110 are turned off, and the integrated starter generator (ISG) 11 employs the diodes to rectify the ISG three-phase AC voltage Vac1. Namely, the ISG three-phase AC voltage Vac1 generated by the integrated starter generator 111 can be introduced to the first connection node 1101*a*, the second connection node 1102*a* and the third connection node 1103*a* and further be rectified by the diodes of the first inverting unit set 1101, the second inverting unit 1102 and the third inverting unit 1103 to generate the DC voltage Vdc with a non-constant voltage level as shown in FIG. 4. Because the switching elements are turned off, the integrated starter generator (ISG) 111 employs the diodes to rectify the ISG three-phase AC voltage Vac1 and the current I from the integrated starter generator 111 will pass through plural diodes, as indicated by the second current flow path J2 shown in FIG. 6, for example. Therefore, the DC voltage Vdc varies with the waveform of the ISG three-phase AC voltage Vac1.

In this embodiment, when the battery heater 14 stop heating the battery module 13 on the condition that the temperature of the battery module 13 is higher than the second threshold temperature, the vehicle control unit 15 is able to control the operation of the internal combustion engine 10, the integrated starter generator (ISG) inverter 111, and the switch unit 16 according to the capacity of the battery module 13, thereby allowing the electric energy of the DC power to be supplied from the integrated starter generator (ISG) inverter 111 or the battery module 13. In other words, when the temperature of the battery module 13 is higher than the second threshold temperature and the electric energy of the DC power is supplied from the battery module 13, the vehicle control unit 15 turns on the first switch S1 and turns off the second switch S2 and ceases the operation of the internal combustion engine 10 and the integrated starter generator (ISG) inverter 110. When the temperature of the battery module 13 is higher than the second threshold temperature and the electric energy of the DC power is supplied from the integrated starter generator (ISG) inverter 110, the vehicle control unit 15 turns off the second switch S2 and start the operation of the internal combustion engine 10 and the integrated starter generator (ISG) 11. Besides, when the temperature of the battery module 13 is higher than the threshold temperature and the electric energy of the DC power is supplied from the integrated starter generator (ISG) inverter 110, the vehicle control unit 15 can turn on the first switch S1 to allow the battery module 13 to be charged.

In this embodiment, as the vehicle control unit 15 carries out the heating process, the DC voltage Vdc generated by the integrated starter generator (ISG) inverter 110 under the rectifier sub-mode is only supplied to the battery heater 14. Under this condition, the first switch S1 is open. As the integrated starter generator (ISG) inverter 110 is supplying power to the battery heater, the battery module 13 will not be charged. Thus, the battery module 13 will not be charged when the battery module 13 is not able to be charged, thereby protecting the battery module 13. As the battery module 13 is heated and its temperature reaches a threshold value, the vehicle control unit 15 turns off the second switch S2 and turns on the first switch S1. Also, the integrated starter generator (ISG) inverter 110 is switched to operate under the generator mode. Under this condition, the energy required by traction motor 12 may be supplied from the battery module 13 or the integrated starter generator (ISG) 11.

It is noteworthy that in order to heat the battery module 13, the invention cuts off the charging line from the integrated starter generator (ISG) 11 to the battery module 13 and allow the integrated starter generator (ISG) inverter 110 to operate under the rectifier sub-mode to supply the electric energy to the battery heater 14 stably.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A starting method for hybrid electric vehicle, comprising:
   (a1) as the temperature of a battery module of the hybrid electric vehicle is below a first threshold temperature, allowing a vehicle control unit of the hybrid electric vehicle to turn on a first switch;
   (a2) converting DC power transmitted from the battery module to a integrated starter generator of the hybrid electric vehicle through the first switch into a first AC power by the integrated starter generator which is operating under the starter mode, and starting an internal combustion engine of the hybrid electric vehicle with the first AC power; and
   (a3) executing a heating process to warm up the battery module by a battery heater.

2. The starting method according to claim 1, wherein the step (a3) comprises steps of:
   (a31) turning off the first switch by the vehicle control unit;
   (a32) changing the control mode of the integrated starter generator to a rectifier sub-mode by the vehicle control unit; and
   (a33) turning on a second switch by the vehicle control unit, and introducing the DC power to the battery heater so as to increase the temperature of the battery module.

3. The starting method according to claim 2, wherein the step (a3) comprises steps of: (a34) adjusting the rotation speed of the internal combustion engine by the vehicle control unit, generating the first AC power, and converting the first AC power into the DC power by the integrated starter generator under the rectifier sub-mode.

4. The starting method according to claim 2, wherein the step (a3) comprises steps of: (a35) controlling heat and an average voltage level of the DC power by adjusting the rotation speed of the internal combustion engine.

5. A hybrid electric vehicle, comprising:
   an internal combustion engine for combusting fuel to transform chemical energy into mechanical power;
   an integrated starter generator mechanically connected to the internal combustion engine for providing power required to start the internal combustion engine or generating electric energy by the power provided by the internal combustion engine;
   a traction motor electrically connected to integrated starter generator for generating power required to propel the hybrid electric vehicle by a DC power;
   a transmission for outputting power to propel the hybrid electric vehicle;
   a battery module for storing electric energy;
   a battery heater for selectively heating the battery module;
   a switch unit electrically connected to the integrated starter generator, the battery module, and the battery heater; and
   a vehicle control unit for controlling the driving of the hybrid electric vehicle;
   when the battery module is below a first threshold temperature which is a relatively low temperature, the vehicle control unit executes a starting process to allow the battery heater to receive the power generated by the integrated starter generator through the switch unit and heat the battery module through the switching operation of the switch unit and stops charging the battery module.

6. The hybrid electric vehicle according to claim 5, wherein the starting process comprises steps of:
   (a1) allowing the vehicle control unit to control a connection between a first terminal and a second terminal of the switch unit to be close;
   (a2) converting the DC power transmitted from the battery module to the integrated starter generator through the switch unit into a first AC power by the integrated starter generator which is operating under the starter mode, and starting the internal combustion engine with the first AC power; and
   (a3) executing a heating process to warm up the battery module by the battery heater.

7. The hybrid electric vehicle according to claim 6, wherein the step (a3) comprises steps of:
   (a31) allowing the vehicle control unit to control the connection between the first terminal and the second terminal of the switch unit to be open;
   (a32) changing the control mode of the integrated starter generator to a rectifier sub-mode by the vehicle control unit; and
   (a33) allowing the vehicle control unit to control a connection between the first terminal and a third terminal of the switch unit to be close, and introducing the DC power to the battery heater so as to increase the temperature of the battery module.

8. The hybrid electric vehicle according to claim 7, wherein the step (a3) comprises steps of: (a35) controlling heat and an average voltage level of the DC power by adjusting rotation speed of the internal combustion engine according to the temperature of the battery module.

9. The hybrid electric vehicle according to claim 6, wherein the step (a3) comprises steps of: (a34) adjusting the rotation speed of the internal combustion engine by the vehicle control unit, generating the first AC power, and converting the first AC power into the DC power by the integrated starter generator under the rectifier sub-mode.

10. The hybrid electric vehicle according to claim 6, wherein the integrated starter generator comprises:
    an ISG inverter having a DC power side connected to the switch unit for converting the DC power into the first AC power or converting the first AC power into the DC power; and
    an integrated starter generator engine having moving parts connected to the internal combustion engine and a power side connected to an AC power side of the ISG inverter for receiving the first AC power to generate power or converting a DC power into the first AC power;
    wherein the ISG inverter and the integrated starter generator engine are configured to operate under the starter mode or the generator mode by the control of the vehicle control unit, and wherein the ISG inverter converts the DC power into the first AC power and the integrated starter generator engine receives the first AC power to generate power to drive the internal combustion engine under the starter mode, and wherein the internal combustion engine drives the ISG inverter to generate the first AC power and the ISG inverter converts the first AC power into the DC power under the generator mode.

11. The hybrid electric vehicle according to claim 6, wherein if the vehicle control unit detects that the battery module is below a second threshold temperature which is above the first threshold temperature, the vehicle control unit controls the switching operation of the switch unit, thereby stop the DC power from being directed to the battery heater.

12. The hybrid electric vehicle according to claim 6, wherein the traction motor comprises:

a traction motor inverter having a DC power side connected to the switch unit for converting the DC power into a second AC power; and
    a traction motor engine having moving parts connected to the transmission and a power side connected to an AC power side of the traction motor inverter for providing power to propel the hybrid electric vehicle.

13. The hybrid electric vehicle according to claim 12, wherein either or both of the first AC power and/or the second AC power are three-phase AC power.

14. The hybrid electric vehicle according to claim 6, wherein the switch unit includes:
    a first switch connected in series with the battery module; and
    a second switch connected in series with the battery heater;
    wherein the vehicle control unit is configured to control the switching operation of the first switch and the switching operation of the second switch, thereby allowing one end of the battery module and one end of the battery heater to be connected to the integrated starter generator respectively through the first switch and the second switch.

15. The hybrid electric vehicle according to claim 6, further comprising a first capacitor connected to the integrated starter generator for filtration.

16. The hybrid electric vehicle according to claim 6, wherein the internal combustion engine, the integrated starter generator, and the traction motor are interconnected in series or in parallel.

\* \* \* \* \*